United States Patent
Mukadam

(10) Patent No.: US 10,394,573 B2
(45) Date of Patent: Aug. 27, 2019

(54) HOST BUS ADAPTER WITH BUILT-IN STORAGE FOR LOCAL BOOT-UP

(71) Applicant: Avago Technologies International Sales Pte. Limited, Singapore (SG)

(72) Inventor: Ketan Mukadam, Bangalore (IN)

(73) Assignee: Avago Technologies International Sales Pte. Limited, Singapore (SG)

(*) Notice: Subject to any disclaimer, the term of this patent is extended or adjusted under 35 U.S.C. 154(b) by 364 days.

(21) Appl. No.: 15/058,095

(22) Filed: Mar. 1, 2016

(65) Prior Publication Data

US 2016/0299767 A1    Oct. 13, 2016

Related U.S. Application Data

(60) Provisional application No. 62/144,329, filed on Apr. 7, 2015.

(51) Int. Cl.
*G06F 3/06* (2006.01)
*G06F 13/42* (2006.01)
*H04L 12/40* (2006.01)
*G06F 9/4401* (2018.01)

(52) U.S. Cl.
CPC .......... *G06F 9/4416* (2013.01); *G06F 3/067* (2013.01); *G06F 3/0619* (2013.01); *G06F 3/0665* (2013.01); *G06F 3/0685* (2013.01); *G06F 13/426* (2013.01); *H04L 12/40013* (2013.01)

(58) Field of Classification Search
CPC .... G06F 13/426; G06F 3/0619; G06F 3/0665; G06F 3/067; G06F 3/0685; G06F 9/4416; H04L 12/40013
See application file for complete search history.

(56) References Cited

U.S. PATENT DOCUMENTS

| | | | |
|---|---|---|---|
| 2004/0153694 A1* | 8/2004 | Nicholson | G06F 9/4416 714/6.31 |
| 2005/0008016 A1* | 1/2005 | Shimozono | G06F 17/30197 370/392 |
| 2014/0059278 A1* | 2/2014 | Schuh | G06F 12/0246 711/103 |
| 2014/0108703 A1* | 4/2014 | Cohen | G06F 3/0616 711/103 |

\* cited by examiner

*Primary Examiner* — Terrell S Johnson
(74) *Attorney, Agent, or Firm* — Sheridan Ross P.C.

(57) ABSTRACT

A method of a storage area network (SAN) includes storing and communicating data received from a server at a host bus adapter via a bus controller of the adapter. In a case where the data is associated with an address corresponding to a default boot logical unit (LUN) of a non-volatile memory (NVM) of the adapter, the data is stored in the NVM. In a case where the data is not associated with an address corresponding to a boot LUN of the NVM, the data is communicated over the SAN. During power up of the adapter, in a case where it is determined that the NVM includes an image of an operating system, the adapter uses the bus controller to provide the server with information to select the NVM as a boot LUN for booting the operating system.

15 Claims, 8 Drawing Sheets

HOST BUS ADAPTER WITH BUILT-IN STORAGE FOR LOCAL BOOT-UP

CROSS-REFERENCE TO RELATED APPLICATIONS

This non-provisional United States (U.S.) patent application claims the benefit of U.S. Provisional Patent Application No. 62/144,329 entitled HOST BUS ADAPTER WITH BUILT-IN STORAGE FOR LOCAL BOOT-UP filed on Apr. 7, 2015 by inventor Ketan Mukadam.

FIELD

The embodiments generally relate to network interfaces of servers in storage area networks.

BACKGROUND

Traditional servers today use a wide variety of storage technologies to store data, such as direct attached storage (DAS), network attach storage (NAS), and storage area network (SAN). Each storage technology may require a different type of data communication protocol to communicate data between the server and the selected type of storage technology. Legacy servers, cannot often communicate with each and every type of protocol and may be limited to DAS and NAS type storage.

Historically, servers were configured to boot their operating system from an internal storage device like a parallel small computer service interface (SCSI) hard disk or serial advanced technology adapter (SATA) hard disk, types of direct attached storage technology within a server or directly attached to it. A host bus adapter (HBA) with the appropriate communication protocol was often used to interface to the hard disks. An on-board or attached SCSI HBA or SATA HBA was used to access the hard disks of a server.

As data centers were introduced to support and share data by network storage devices, the local hard disks of a server were no longer used to store data. In many servers, the on-board or attached SCSI HBA or SATA HBA and hard disk was used as the boot device of the server, to start up the server with its operating system (OS) software.

The use of local storage only for operating system boot of a server became problematic, particularly as thousands of servers were introduced into data centers. The hard disk drive form factor also became an issue because the small form factor size of servers used in equipment racks. Disk-less servers became desirable.

BRIEF SUMMARY

The embodiments are summarized by the claims that follow below.

BRIEF DESCRIPTIONS OF THE DRAWINGS

Embodiments of the invention will be described with reference to the Figures, in which like reference numerals denote like elements and in which.

DETAILED DESCRIPTION

Figure 1:
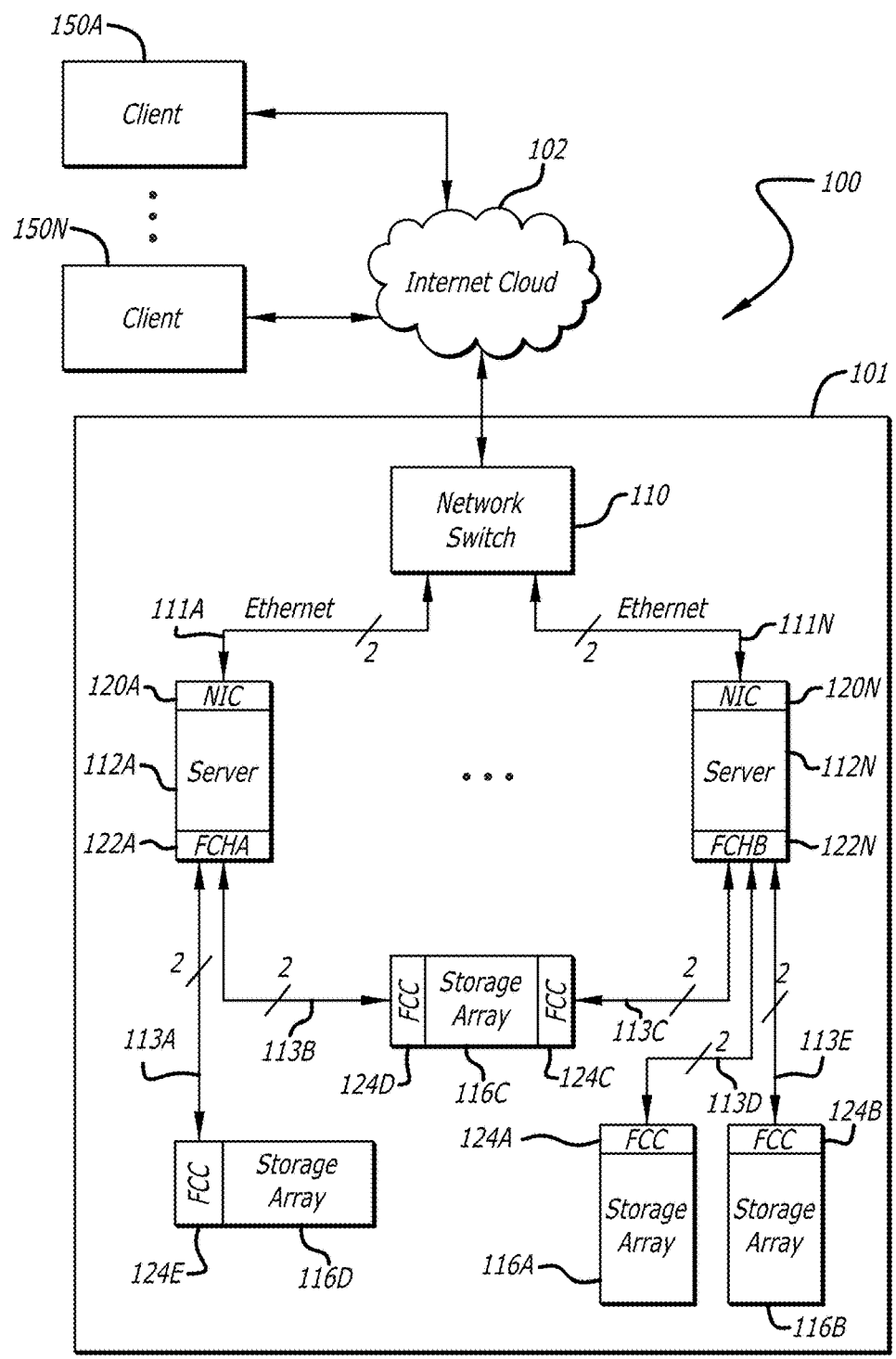
FIG. 1 illustrates a functional block diagram of a portion of a data center configured for Fibre Channel connectivity or Ethernet connectivity.

In the following detailed description, numerous specific details are set forth in order to provide a thorough understanding of various embodiments. However, it will be obvious to one skilled in the art that the embodiments may be practiced without these specific details. In other instances well known methods, procedures, components, and circuits have not been described in detail so as not to unnecessarily obscure aspects of the embodiments.

Introduction

Computer networks have become specialized in the storage of data and are often referred to as a storage network or storage area network (SAN). These storage networks often included network storage devices in communication with servers to service the needs of clients for the data stored in the storage area network. The network storage devices consist of storage devices (e.g., an array of a plurality of hard disks) with storage controllers that provide enhanced data access services. These controllers create logical units (LUNs), comprised of a portion of the storage capacity of the storage devices in the networked storage device. The controller then presents the storage capacity as LUNs to the servers in the network and the clients and applications that use the server.

With disk-less servers, boot up of a server with operating system software becomes challenging. Storage of operating system software often needs one or more gigabytes of non-volatile storage capacity. Providing one or more gigabytes of non-volatile storage capacity in a server without using a magnetic hard disk was previously economically infeasible. Storage capacity of the networked storage devices in storage area networks (SANs), removed (remotely located) from a server, were then used to boot up the servers and virtual machines, if any, with operating system software. Unfortunately, configuring boot up of servers with remotely located storage capacity of a SAN, referred to as a remote boot logical unit (LUN), has some issues.

One of the issues of booting up a server from a remote boot LUN in a SAN is a compatibility issue. In a server, the host bust adapter (HBA) may not provide the required support to boot up from a remote boot LUN of a networked storage device in a SAN. Legacy HBAs may not support the proper protocols to be able to communicate with networked storage devices in a SAN. Another issue of booting up a server from a remote boot LUN within a SAN is the possibility of fabric failure. The communication connections provided by the SAN fabric between server and networked storage array may be lost such that the OS boot from the SAN will fail. The SAN fabric can experience failures, for example, when a plurality of large servers try to concurrently boot up at the same time. Another issue of booting up a server from a remote boot LUN of a SAN are configuration issues. After replacing a server, the server being boot up from a remote boot LUN in a SAN often needs to be configured. The configuration process can delay the startup of a new or replacement server. The configuration adds a complexity to the setup for booting up a server from a remote boot LUN of a SAN. The configuration often requires debugging to be sure that it will work in a given data center or SAN.

Due to dramatic increase in rack-mount and blade servers, there is a need to convert servers to diskless servers to lower costs, lower power consumption, reduce cooling requirements, and meet form factor constraints. Accordingly, it is desirable to overcome the disadvantages of booting up diskless servers from remote boot LUNs of a SAN.

The embodiments include a method, apparatus and system for local server boot-up functionality in storage area networks. A SAN host bus adapter (SAN HBA) for servers is disclosed that includes sufficient nonvolatile memory (NVM) storage to provide a local boot-up from operating system (OS) software. The SAN host bus adapter may provide one or more communication protocols such as internet small computer system interface (iSCSI), ATA-over-Ethernet (AoE), Fibre Channel (FC), Fibre Channel over Ethernet (FCoE), Fibre Channel over IP (FCIP), Hyper-SCSI SCSI over Ethernet frames instead of IP, ISCSI Extensions for RDMA (iSER), and Internet Fibre Channel Protocol (iFCP).

The SAN host bus adapter includes a non-volatile memory controller coupled to read-writeable non-volatile memory devices to provide sufficient nonvolatile memory storage to store a boot operating system.

Computer Data Center with Local San Boot Servers

Referring now to FIG. 1, a block diagram of a data center computer network 100 is illustrated. The data center computer network 100 can include a network switch 110, one or more servers 112A-112N, and one or more networked storage array appliances (networked storage arrays or devices) 116A-116D. One or more clients 150A-150N may interface with the data center computer network 100 over a wide area network (WAN) 102, such as the Internet. The one or more clients 150A-150N may desire one or more server functions of the servers 112A-112N for software applications and/or storage capacity provided by the networked storage arrays 116A-116D to store data. The servers 112A-112N interface to the networked storage arrays 116A-116D to provide the storage capacity to clients and utilize the storage capacity for their own purposes, such as remote LUN boot up of virtual machines, for example.

The network switch 110 in the data center 100 is coupled to the wide area network (WAN) 102 such as the internet or world wide web. This allows data to be communicated between the servers/storage arrays in the data center 100 and the one or more remotely located clients 150A-150N over the WAN 102.

The servers 112A-112N are coupled to the network switch 110 via Ethernet cables 111A-111N terminating into network interface (Ethernet) cards 120A-120N installed into servers 112A-112N. The servers 112A-112N further have host adapter cards 122A-122N respectively installed into them. The host adapter cards 122A-122N couple to the storage area network formed by the networked storage arrays, the cables, and switching fabric, if any. Accordingly, the host adapter cards may be referred to as SAN host adapter cards, or Fiber Channel host adapter cards, due to the likelihood of a Fibre Channel protocol being used to communicate information.

The network storage arrays 116A-116D also include host bus adapter cards 124A-124E to couple to the storage area network formed by the networked storage arrays, the cables, and switching fabric, if any.

In one embodiment, a network storage array unit 116C includes a pair of host bus adapter cards 124C-124D installed to receive signals carrying information (data, control, instructions, acknowledgments, etc.) from the one or more servers 112A-112N via wires or cables, such as Fibre Channel cables 113B-113C. The network storage arrays 116A-116B,116D include host bus adapter cards 124A-124B,124E, to respectively communicate with one or more of the servers 112A-112N over the cables 113A,113D-113E.

The host bus adapter cards 124A-124B,124E for the storage arrays, the storage targets, may differ from the SAN host bus adapters 122A-122N in the servers because less processing power may be needed. The host bus adapter cards 124A-124B, 124E may connect to a non-volatile storage or a magnetic storage memory that stores operating system software from which the respective attached server unit may boot up.

One of ordinary skill in the art will recognize that the host adapter cards can support Fibre Channel over Ethernet (FCOE) as well as other communication protocols over either copper and/or optical cables. One of ordinary skill in the art will also recognize that the host adapter cards can support high-speed wireless communication protocols between pairs of wireless transmitters/receivers (transceivers).

San Network Storage Array

Figure 4:
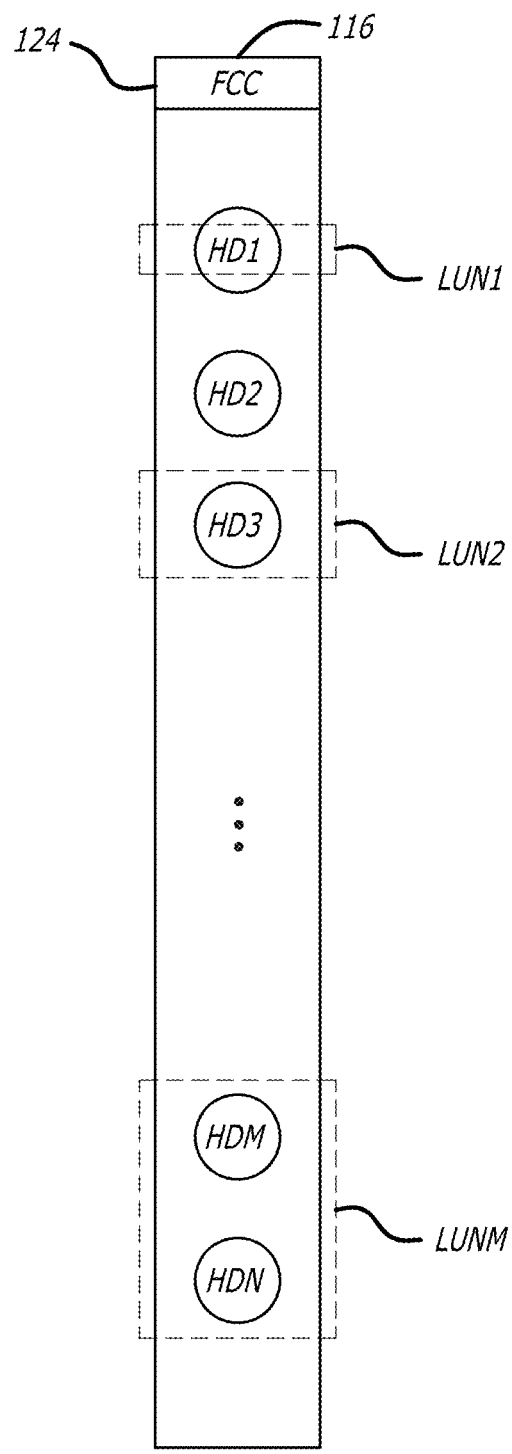
FIG. 4 illustrates a functional block diagram of a networked storage array unit with remote logical units (LUNs) of storage capacity.

Referring now to FIG. 4, a block diagram of an exemplary networked storage array 116 is shown. The exemplary networked storage array 116 may be instantiated as the networked storage arrays 116A-116B illustrated in FIG. 1. Each networked storage array 116 includes one or more Fibre Channel cards (FCC) 124 installed to receive and send signals via wires and cables or optical fibre in the storage area network.

The storage array 116 may include a storage media, such as a plurality of hard disk drives HD1-HDN. The storage array 116 may alternatively have a plurality of optical disk drives OD1-ODn or a plurality of solid state drives SSD1-SSDn, for example, as the storage media.

The storage capacity in the storage array 116 may be divided up and logically assigned numbers referred to as logical unit numbers (LUN). Storage capacity in a given storage media may be split up into one or more LUNs. The storage capacity assigned to a LUN may be based on the desired capacity for a given function or application. For example, logical unit 1 (LUN 1) may be assigned to a fraction of the capacity of a first hard drive HD1 for a functional requiring little storage capacity. Logical unit 2

(LUN 2) may be assigned to the entire capacity of the third hard drive HD3, for example. Logical unit M (LUN M) may be assigned to a plurality of hard drives HDM-HDN, for example, for a function requiring significant storage capacity.

One or more of the logical units of storage capacity of a storage array or network storage device in a SAN may be used to store operating system software from which a computer server or a virtual machine may boot up. The LUN in this case is remote from and not included within the server and/or the virtual machine. In this case, the LUN may be referred to as a remote boot LUN from which a server or virtual machine will boot up.

Server with Local SAN Boot-Up

Figure 2A:
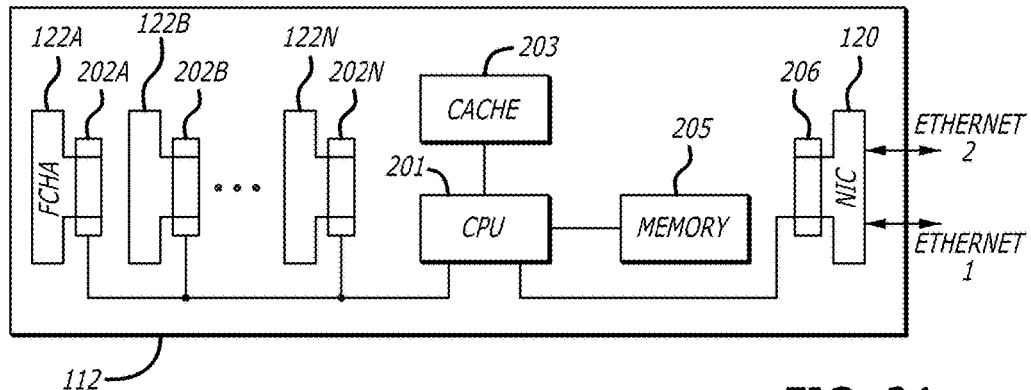
FIG. 2A is a functional block diagram of a server with Fibre Channel and Ethernet adapter cards for data communication over various types of interfaces.

Referring now to FIG. 2A, a block diagram of a server 112 that is exemplary of the servers 112A-112B shown in FIG. 1 is illustrated. Each server 112 includes one or more host bus adapters (FCHA) 122A-122N with edge connectors operatively coupled to the host bus of the server by sockets 202A-202N. The one or more host bus adapters (FCHA) 122A-122N are used for data communication with the networked storage devices in the storage area network using various communication protocols. The host bus adapter cards 122A-122N, for example, may communicate with networked storage devices using a Fibre Channel over Ethernet (FCoE) communication protocol. The host bus adapters cards (FCHA) 122A-122N may alternatively communicate with networked storage devices using an internet small computer system interface (iSCSI) protocol, or other computer network communication protocol.

The server 112 may also include one or more high speed Ethernet cards 120 with an edge connector that may be operatively coupled to a bus of the server with a socket 206. The Ethernet card 120 may be used for data communications with clients over the internet.

Each server 112 further includes one or more processors 201, a cache memory 203, and scratch pad memory 205 coupled together as shown. The server 112 is diskless, without any hard disk drive or a solid state storage drive (SSD) to store software instructions. Instead, the software instructions of software drivers and software applications for execution by the one or more processors of the server may be stored in remote boot LUNs associated with the network storage devices in a SAN. The one or more processors 201 may be multi-processors having multiple processor cores in one package that can be assigned to certain server functions. A portion of the cache memory 203 may be allocated and assigned to each processor 201 for use. The cache memory 203 may be a flash based cache memory (FBC) that is non-volatile to retain data in the event of power down or a catastrophic power failure.

One or more of the host bus adapters (FCHA) 122A-122N include read-writeable non-volatile memory into which an operating system is locally stored. Upon power up, the server 112 can initially boot up from the locally stored operating system without the need to access a remote boot LUN. Subsequently, one or more remote boot LUNs may be used to boot up other operating systems, such as to boot up virtual machines that may operate on the server.

Host Bus Adapters with Non-Volatile Storage

Figure 3A:
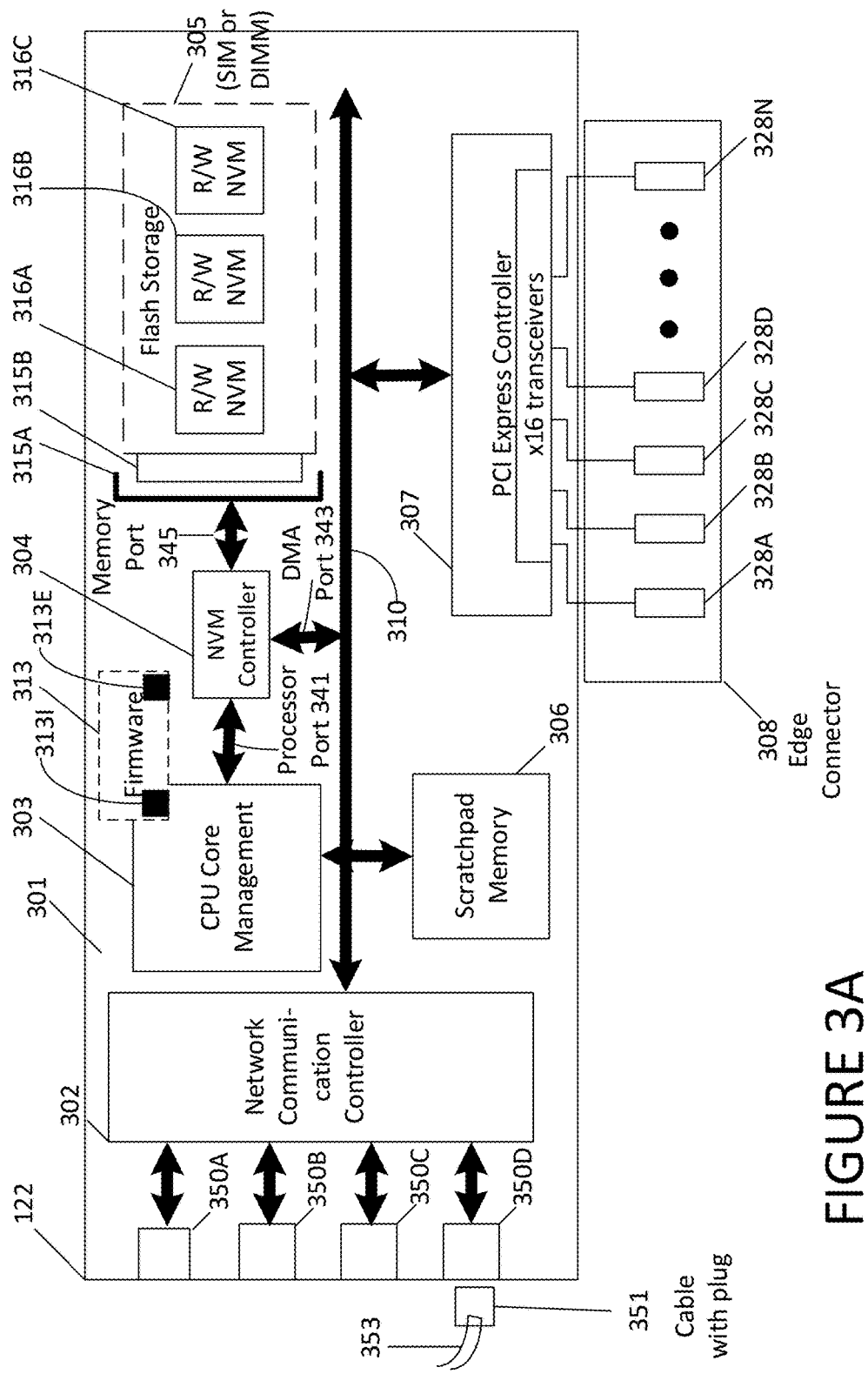
FIG. 3A illustrates a functional block diagram of an adapter card that may be used in the server shown in FIG. 2 to provide SAN boot with a local boot LUN of storage capacity.
Figure 3B:
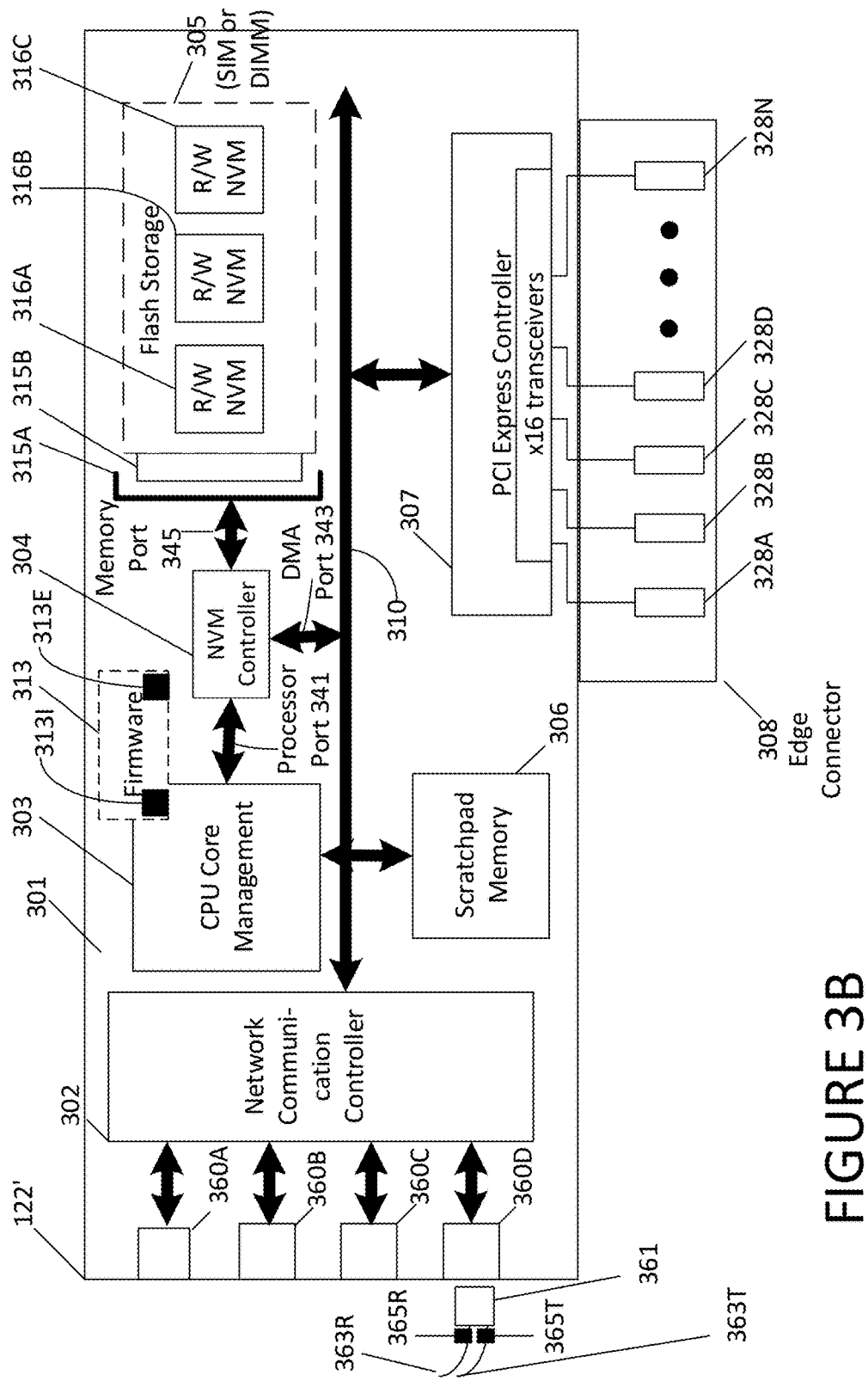
FIG. 3B illustrates a functional block diagram of an adapter card that may be used in the server shown in FIG. 2 to provide SAN boot with a local boot LUN of storage capacity.

Referring now to FIGS. 3A-3B, a functional block diagram of a host bus adapter card 122,122' is shown with built in non-volatile memory controller 304 and built-in read-writeable non-volatile storage memory 305. The read-writeable non-volatile storage memory 305 acts as a default LUN with a default LUN number (having a default LUN (e.g., LUN 0 or LUN 9999) from which the host computer or server can boot up an operating system. Because the host bus adapter card 122 interfaces with the SAN, it may be referred to as a SAN host bus adapter.

The SAN host bus adapter card 122 includes a printed circuit board 301 with a network communications controller 302, a management processor 303, a non-volatile (NV) memory controller 304, read-writeable non-volatile storage memory 305, scratch pad memory 306 and a PCI express bus controller 307 mounted thereto and coupled to a plurality of wire traces of the printed circuit board. The network communications controller 302, the management processor 303, the non-volatile (NV) memory controller 304, the scratch pad memory 306 and the PCI express bus controller 307 are coupled together by an adapter bus 310 formed by a plurality of wire traces of the printed circuit board.

The network communications controller 302 couples the server in communication with the storage area network. The network communications controller 302 is configured to communicate information using one or more communication protocols such as internet small computer system interface (iSCSI), ATA-over-Ethernet (AoE), Fibre Channel (FC), Fibre Channel over Ethernet (FCoE), Fibre Channel over IP (FCIP), HyperSCSI SCSI over Ethernet frames instead of IP, ISCSI Extensions for RDMA (iSER), and Internet Fibre Channel Protocol (iFCP). The network communications controller 302 presents remote LUNs, including any remote boot LUN, to the server for use of its storage capacity.

The network communications controller 302 may physically couple to the storage area network in various ways. In accordance with one embodiment, the network communications controller 302 couples to one or more RJ-45 jacks 350A-350D, also referred to herein as Ethernet jacks, as is illustrated in FIG. 3A. The Ethernet jacks 350A-350D receive plugs 351 of Ethernet cables 353 to physically connect the server to the SAN.

Referring now to FIG. 3B, in accordance with another embodiment, the network communications controller 302 couples to one or more small form pluggable (SFP) sockets 360A-360D. The one or more SFP sockets 360A-360D can receive a connector or edge connection of an SFP transmitter/receiver (transceiver) 361. The SFP transceiver 361 may be a wired SFP transmitter/receiver in which case differential electrical signals are propagated over a transmit cable 363T and a receive cable 363R to communicate information between the server and other networked devices in the storage area network. The SFP transceiver 361 may be an electro-optical (EO) SFP transmitter/receiver in which case optical signals are propagated over the transmit cable 363T and the receive cable 363R to communicate information between the server and other networked devices in the storage area network. With an EO SFP transmitter/receiver, optical fibres of the transmit cable 363T and the receive cable 363R terminate in optical plugs 365T and 365R, respectively, which are in turn plugged into the SFP transceiver 361.

Mixed or matched, a wired SFP transmitter/receiver and an EO SFP transmitter/receiver may be selectively plugged into the one or more SFP sockets 360A-360D. With the appropriate selection of SFP transceivers 361, wire cables, optical fibre cables, or a combination thereof may be selectively used to couple a server to the storage area network.

Referring to FIGS. 3A-3B, The non-volatile (NV) memory controller 304 has a processor I/O port 341 to couple to the management processor 303, a memory I/O port 345 to couple to the read-writeable storage memory 305, and a direct memory access (DMA) I/O port 343 to couple to the adapter bus 310. Access to the read-writeable non-volatile storage memory 305 is typically through the processor port 341. However, a direct memory access may be set up by the processor 303 so that a device or process can directly access the read-writeable non-volatile storage memory 305 over the DMA I/O port 343, bypassing the processor 303.

In one embodiment, the read-writeable non-volatile storage memory 305 includes one or more read-writeable non-volatile memory devices 316A-316C mounted to the printed circuit board 301 and coupled to a plurality of traces thereof to couple to the NV memory controller 304. In another embodiment, the read-writeable non-volatile storage memory 305 includes one or more read-writeable non-volatile memory devices 316A-316C mounted to a printed circuit board with an edge connector 315B to form a read-writeable non-volatile memory module 305 that plugs into a socket 315A of the printed circuit board 301. The socket 315A is mounted to the printed circuit board 301 and wire traces couple the socket 315A to the memory I/O port of the NVM controller 304. In one embodiment, the read-writeable non-volatile memory module 305 has a form factor of a single or dual in-line memory module (SIMM or DIMM). In one embodiment, the read-writeable non-volatile memory module 305 has a form factor of a small outline dual in-line memory module (SODIMM). The form factor may slightly vary depending upon the pin-out chosen (e.g., 100, 144, 200, 204, or 260 pins) for the SODIMM.

The one or more read-writeable non-volatile memory devices 316A-316C may be various types of read-writeable non-volatile random access memory integrated circuit (IC) devices, such as flash memory (e.g., NAND or NOR electrically erasable programmable read only memory (EEPROM), resistive random-access memory (RRAM), phase-change memory (PCM), or conductive-bridging random access memory (CBRAM), for example. Conductive-bridging random access memory (CBRAM) may also be referred to as electrolytic memory and nano-bridge memory. Read-writeable non-volatile random access memory integrated circuit (IC) devices are now more reliable and have increased endurance, such that they may be used to store operating system software and boot directly from memory.

The read-writeable non-volatile storage 305 is a DAS type of storage that is integrated or built-in into the SAN host bus adapter 112. Accordingly, the SAN host bus adapter 112 not only provides communication to the storage in the SAN, but also allows the server in which it is installed to boot-up its operating system without another adapter. To the server and its processors, the read-writeable non-volatile storage 305 appears to be a logical unit (LUN) of storage capacity. In one embodiment, the LUN representing the read-writeable non-volatile storage 305 is a SCSI LUN. If redundancy is desired for increased reliability, a pair of SAN host bus adapters 112 that include the read-writeable non-volatile storage 305 may be used within a server.

The SAN host bus adapter card 122 includes HBA firmware 313, a set of executable instructions that the management processor 303 can execute. A portion of firmware 313 may be stored in an internal storage device 313I as part of the management processor 303. Alternatively or conjunctively, a portion of firmware 313 may be stored in an external storage device 313E mounted to the printed circuit board and coupled in communication with the processor 303 by wire traces of the PCB 301.

The firmware 313 includes boot driver code that exposes the LUN of the non-volatile storage memory 305 to the BIOS of the server for any of operating system type (e.g., INTEL x86 BootBIOS, UEFI, or OpenBoot). The firmware 313 when executed by the management processor 303 exposes the read-writeable non-volatile storage memory 305 as a local default LUN to the host server and its one or more processors. The local default LUN, representing the stored data in the read-writeable non-volatile storage memory 305, is exposed to the host server regardless of whether or not the SAN HBA 122 is coupled to the network of SAN fabric and storage devices of a SAN.

If the HBA 122 is coupled to the network of SAN fabric, the HBA 122 discovers remote LUNs of networked storage devices in a storage area network using one or more network communication protocols (e.g., iSCSI, FC, and/or FCoE) and presents them to the host server and its processors. One or more remote LUNs in the SAN may be set up as remote boot LUNs for virtual machines, for example. With remote boot LUNs, the boot driver code of the firmware will not only expose the default LUN to the BIOS of the server but also the remote boot LUNs associated with the networked storage devices of the SAN that may store operating system software for virtual machines, for example.

Referring now to FIG. 3B, a functional block diagram of an alternate embodiment of a host bus adapter card 122' is shown. The alternate host bus adapter card 122' is for interfacing with small form pluggable (SFP) transmit/receive (transceiver) modules to selectively interface with wire cables or optical fibers. For optical fibers, a fiber optical SFP transceiver module is plugged into a cage and connector of an SFP receptacle. For wire cables, a wired SFP module may be plugged into the cage and connection of the SFP receptacle. In this manner, signals may be selectively carried by photos (light) or by electrons (current) between networked devices and the host bust adapter card 122'.

But for the connection to the storage area network, the adapter card 122' is similar to the adapter card 122, including the read-writeable nonvolatile storage memory. In either case, the adapter card 122,122' may be the host adapter of the server 112 to provide a local boot LUN to boot up the server.

While the host bus adapter 122,122' has been described as providing a local boot storage, instead of relying on a remote boot LUN of the SAN fabric or requiring a DAS adapter and hard disk, the host bus adapter 122,122' can provide additional functionality when used in a network. The host bus adapter 122 can include maintenance/debugging software stored into the non-volatile storage memory so that a server and the host adapter can be tested and errors debugged in advance of deployment. To ensure a reliable local boot LUN, multiple HBAs 122,122' may be used in the same server to form a RAID-type topology for the operating system boot up process. The operating system and/or firmware is centralized and can be readily managed/maintained by the HBA 122 by downloading over the internet from a server and storing it into the non-volatile storage memory automatically without end-user action. Upon completion of the upgrade, the end user can be informed of the update. Servers are often introduced in one or more pairs of servers for redundancy. Replication of boot information (e.g., boot configuration and OS software) onto storage devices in the SAN can be readily performed using the SAN HBA 122 and the built-in non-volatile storage memory.

Figure 3C:
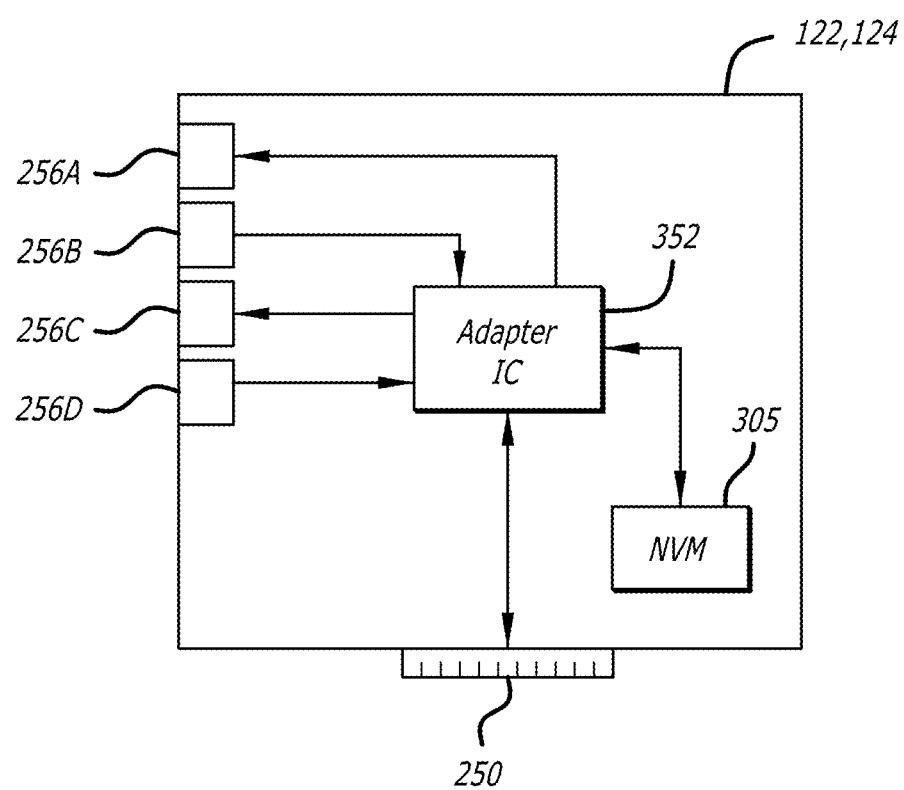
FIG. 3C illustrates a functional block diagram of an adapter card with an integrated adapter chip and non-volatile storage memory to provide SAN boot with a local boot LUN of storage capacity.

Referring now to FIG. 3C, the network communications controller 302, the management processor 303, the non-volatile (NV) memory controller 304, the scratch pad memory 306 and the bus controller 307 may be integrated together into a single integrated circuit device, an intelligent adapter chip 352. The intelligent adapter chip 352 is mounted to the printed circuit board 301 thereto and coupled to a plurality of its wire traces so that it is coupled in communication with the edge connector 308, the read-writeable non-volatile storage memory 305, and the connectors to couple the host bus adapter 122 and the server to the computer network.

Server with Local SAN Boot-Up and VMS with Remote SAN Boot-Up

Figure 2B:
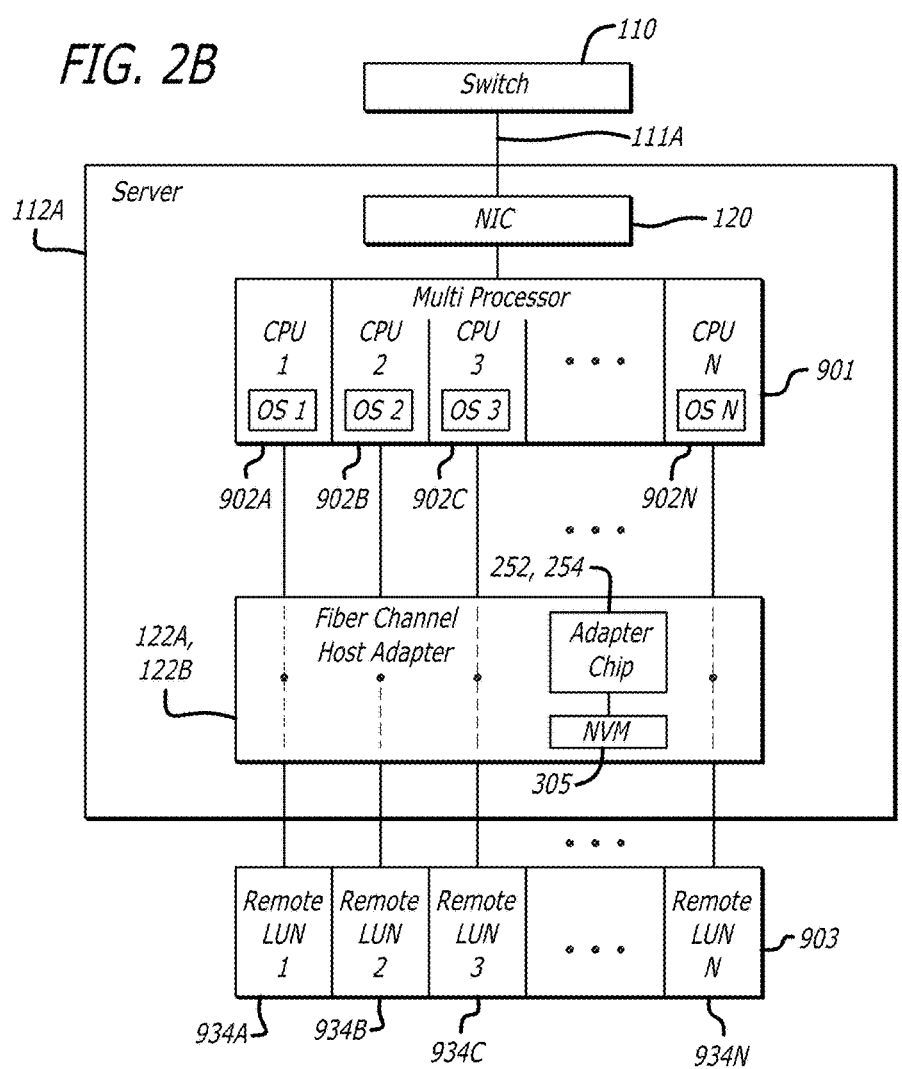
FIG. 2B is a functional block diagram of a server with an initial boot up from a local boot LUN and a multiprocessor to provide virtual machines with boot up from remote boot LUNs.

Referring now to FIG. 2B, a block diagram of a server 112' that may be exemplary of one or more of the servers 112A-112N shown in FIG. 1 is illustrated. The server 112' includes a multiprocessor 901 and a host bus adapter (HBA) 122 coupled together through a back plane structure within the server that may be provided by a printed circuit board. The multiprocessor 901 may also coupled to a cache memory and a random access memory to store data for each processor.

The multiprocessor 901 includes a plurality of central processor unit cores CPU1 through CPUN (902A-902N).

The server 112' is connected to a network switch 110 via Ethernet cables 111A and the Ethernet host bus adapter 120 so that it can communicate with clients. The server 112' is connected to the storage area network through the host bust adapter 122 so that storage capacity of a plurality of remote LUNs 934A-934N are respectively made available to the plurality of central processor unit cores CPU1 through CPUN (902A-902N).

The host bus adapter 122' is similar to the host bus adapter 122. The host bus adapter 122' includes an adapter chip 252 coupled to the CPU cores 902A-902N of the multiprocessor 901. The adapter chip 252 is also coupled to the remote LUNs 934A-934N associated with one or more the networked storage array units in the SAN.

The host bus adapter 122' further includes the nonvolatile storage memory 305, a local boot LUN, that stores the initial boot operating system for the server 112'. Upon power up or restart, the server 112' boots up with the initial boot operating system from the local boot LUN. The initial boot operating system may be a hypervisor operating system. Subsequently, the hypervisor operating system may allow each of the central processor unit cores CPU1 through CPUN (902A-902N) to boot up with different operating systems, operating systems OS1-OSN, and execute different applications that are stored in the respective remote LUNs 934A-934N (remote LUN1 through remote LUNN). Each central processor unit cores CPU1 through CPUN (902A-902N) can then be associated with respective virtual machines or virtual servers for interfacing with clients and the storage area network. One or more of the central processor unit cores CPU1 through CPUN (902A-902N) may continue to execute the initial boot operating system from the local boot LUN, allowing the virtual machines to shut down, re-start or migrate to another central processing unit core. The initial boot operating system of the local boot LUN may also allow new operating systems to be installed on one or more of the remote LUNs 934A-934N.

OS Software Install Methods

Operating system software may be preinstalled into the non-volatile storage memory 305 so that boot-up of the server is transparent. The non-volatile storage memory 305 may be plugged into the host adapter or prewritten into it through the edge connector. The host bus adapter 122 need only be plugged into a socket of the server.

Alternately, the operating system software may be installed using an optical disk drive that may be available within a server with the host bus adapter 122. An OS installer compact disk (CD) or digital video disk (DVD) is put into the optical disk drive of the server system.

The OS installer includes an OS installation module that includes machine-executable instructions that when executed by a processor (e.g., processor 201 of server 112 of FIG. 2A) cause the processor to control storage of machine-executable instructions of the operating system onto a non-volatile storage device (e.g., the non-volatile storage memory 305) of a host bus adapter (e.g., a host bust adapter 122 of the server 112 of FIG. 2A, 2B). The stored machine-executable instructions of the operating system include instructions that when executed by a processor (e.g., processor 201 of server 112 of FIG. 2A) control the processor to boot the operating system.

The OS installer also includes machine-executable instructions of a host bus adapter driver for interfacing a server (whose processor is executing the instructions) with a host bus adapter (e.g., the host bus adapters 122 and 122' of FIGS. 2A, 2B, 3A and 3B). The host bus adapter driver is constructed to expose the default LUN of the non-volatile storage memory 305 to an OS storage stack of the operating system. In one embodiment, the default LUN appears to be a SCSI LUN to the processor of the server system. Input/output signals for the host bus adapter 122 are directed by firmware to the non-volatile memory controller 304.

Figure 5A:
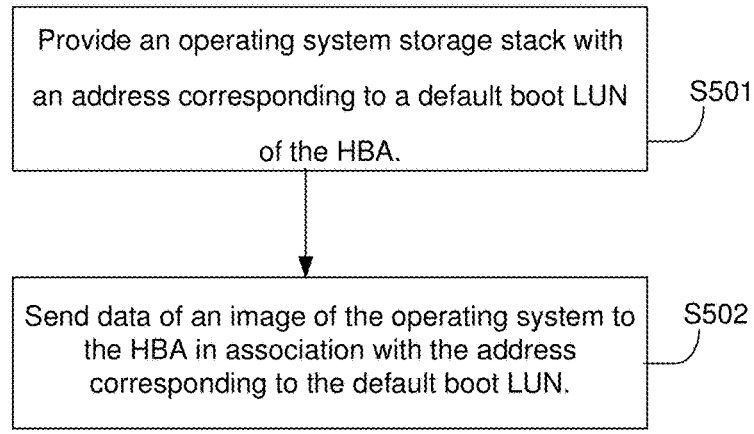
FIG. 5A illustrates a functional flow diagram of operating system (OS) installation.

Referring now to FIG. 5A, a functional flow diagram of operating system (OS) installation is illustrated. In accordance with an embodiment of FIG. 5A, operating system installation includes, at a disk-less server (e.g., the server 112 of FIG. 2A, 2B): providing an operating system storage stack with an address corresponding to a default boot LUN of an HBA (e.g., one of the host bus adapters 122 and 122' of FIGS. 2A, 2B, 3A and 3B) (process S501), and sending data of an image of the operating system to the HBA in association with the address corresponding to the default boot LUN (process S502).

In an implementation, the process of FIG. 5A is performed responsive to user selection of a SAN boot installation involving the HBA, the user selection being received by an OS installer executed by the server. In an implementation, responsive to the user selection of the SAN boot installation involving the HBA, the OS installer uses an HBA driver of the HBA to obtain addresses of one or more SAN boot LUNs accessible by using the HBA. In an implementation, responsive to the OS installer, the HBA driver provides the OS storage stack with the address of the default LUN of the HBA in addition to addresses corresponding to bootable LUNs accessible by the HBA In an implementation, sending data of the image of the operating system to the HBA (for storage at an NVM of the HBA) is performed responsive to user selection of the address of the default boot LUN of the HBA, the user selection being received by the OS installer.

In the embodiment of FIG. 5A, the address corresponding to the default boot LUN corresponds to a memory location of a non-volatile memory (NVM) of the HBA (e.g., the flash storage 305 of FIGS. 3A and 3B) that is associated with the default boot LUN.

In some embodiments, the operating system storage stack is provided with any suitable type of information for installing an image of the operating system onto a non-volatile memory (NVM) of the HBA at a memory location associated with a default boot LUN of the HBA.

In an implementation, providing the operating system storage stack with the address of the default boot LUN (process S501) includes providing the address to the storage stack as an address corresponding to a SAN (Storage Area Network) boot LUN, and sending the data of the image to the HBA includes sending the data in accordance with a process for installing a bootable operating system image on a SAN boot LUN.

In an implementation, providing the operating system storage stack with the address of the default boot LUN (process S501) includes providing the address to the storage stack as an address corresponding to a SAN boot SCSI (Small Computer System Interface) LUN, and sending the data of the image to the HBA includes sending the in accordance with a process for installing a bootable operating system image on a SAN boot SCSI LUN.

In an implementation, the address is an I/O address of the bus controller of the HBA (e.g., the bus controller 307 of FIGS. 3A and 3B) and the server sends the data to the HBA by sending an I/O request (e.g., a write request) to the bus controller in accordance with a bus communication protocol of the bus controller.

In an implementation, the address is an address of an I/O write request of the bus controller of the HBA (e.g., the bus controller 307 of FIGS. 3A and 3B) and the server sends the data to the HBA by sending an I/O request (e.g., a write request) to the bus controller in accordance with a bus communication protocol of the bus controller. In an implementation, the bus controller of the HBA is a PCI express controller (e.g., the controller 307 of FIGS. 3A and 3B), and the address is an address of an I/O write request of the PCI express controller and the server sends the data to the HBA by sending an I/O write request to the PCI express controller in accordance with a PCI express communication protocol.

In an implementation, the bus controller of the HBA is a PCI express controller (e.g., the controller 307 of FIGS. 3A and 3B), and the address is specified in a PCI express write request of the PCI express controller, and the server sends the data to the HBA by sending the PCI express write request to the PCI express controller in accordance with a PCI express communication protocol.

In an implementation, a processor of the server executes machine-executable instructions of a host bus adapter driver to provide the operating system storage stack with the address corresponding to the default boot LUN. In implementation, the address is a predetermined address. In some implementations, the host bus adapter driver is used to obtain the address from the HBA via a bus controller (e.g., the bus controller 307 of FIGS. 3A and 3B).

In an embodiment, the processes of FIG. 5A are performed by a processor of a server (e.g., processor 201 of server 112 of FIG. 2A) that executes machine-executable instructions of an OS installer that are loaded into a memory (e.g., the memory 205 of FIG. 2A) from a non-volatile storage device (e.g., a compact disk (CD) or digital video disk (DVD), and the like). In an implementation, the machine-executable instructions of the OS installer include machine-executable instructions of the host bus adapter driver. In some implementations, the machine-executable instructions of the OS installer include machine-executable instructions for accessing the machine-executable instructions of the host bus adapter driver.

By virtue of providing the operating system storage stack with the address of the default boot LUN on the HBA as an address corresponding to a SAN boot LUN, the server can send the data of the image to the HBA in accordance with a process for installing a bootable operating system image on a SAN boot LUN. In other words, the operating system installation process for installing an OS image on a LUN remotely located from the HBA can be used to install the OS image on the NVM of the HBA.

Figure 5B:
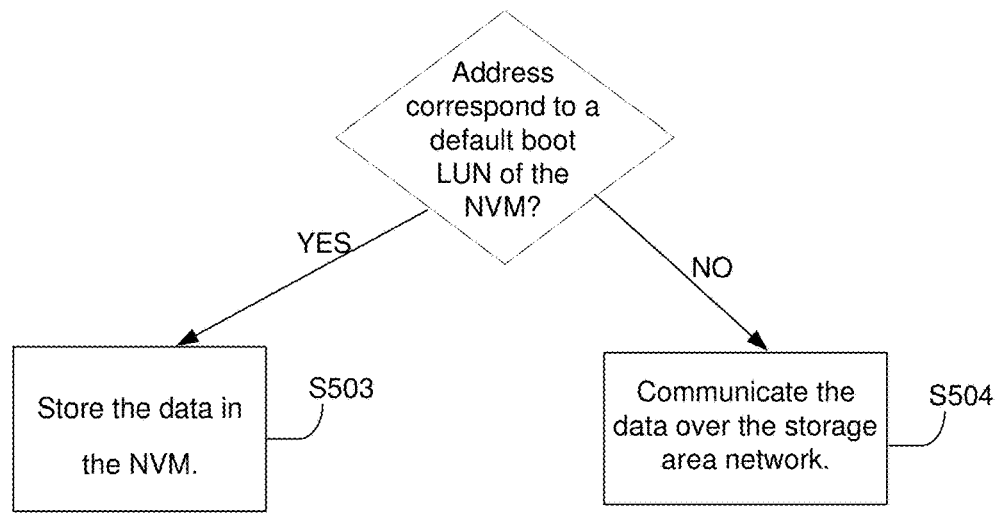
FIG. 5B illustrates a functional flow diagram of operating system (OS) installation

Referring now to FIG. 5B, a functional flow diagram of operating system (OS) installation is illustrated. In accordance with an embodiment of FIG. 5B, operating system installation includes, at the HBA (e.g., one of the host bus adapters 122 and 122' of FIGS. 3A and 3B), and responsive to data received from the server via the bus controller of the HBA (e.g., the bus controller 307): in a case where the data is associated with an address corresponding to a default boot LUN of a non-volatile memory (NVM) of the HBA, storing the data in the NVM (process S503), and in a case where the data is not associated with an address corresponding to a boot LUN of the NVM, communicating the data over the storage area network (process S504).

In an implementation, the address is an I/O address of the bus controller. In an implementation, the address corresponds to a memory location of the NVM that is associated with the default boot LUN. In an implementation, the HBA receives the address from the server via the bus controller of the HBA. In an implementation, the HBA receives the data responsive to an I/O request (e.g., a write request) in accordance with a bus communication protocol of the bus controller of the HBA. In an implementation, the bus controller is a peripheral component interconnect (PCI) express controller constructed to communicate information between the HBA and the server by using a PCI express protocol.

In an implementation, the bus controller of the HBA is a PCI express controller (e.g., the controller 307 of FIGS. 3A and 3B), the address is specified in a PCI express write request of the PCI express controller, the server sends the data to the HBA by sending the PCI express write request to the PCI express controller in accordance with a PCI express communication protocol, the HBA obtains the address and the data responsive to the received PCI express write request, and the address corresponds to a memory location of the NVM that is associated with the default boot LUN. In an implementation, the PCI express write request is a same type of PCI write request used by the server to perform a SAN boot installation process that involves sending data of an OS image for storage on a remote SAN LUN via a SAN.

In an implementation, the default boot LUN is a SCSI (Small Computer System Interface) boot LUN. In some implementations, the default boot LUN is any suitable type of SAN boot LUN.

In the embodiment of FIG. 5B, the data stored at the memory location of the default boot LUN includes an image of an operating system, and the image is used by the server to boot the operating system from the NVM.

In an implementation, storing the data in the NVM (process S503) includes controlling a processor of the HBA (e.g., the management processor 303 of FIGS. 3A and 3B) to store the data by controlling an NVM controller (e.g., the NVM controller 304 of FIGS. 3A and 3B) of the HBA to store the data in the NVM at a memory location that is associated with the default boot LUN.

In an implementation, the address of the default boot LUN is stored in association with the memory location of the default boot LUN in a firmware storage device of the HBA (e.g., the internal storage device 313I and the external storage device 313E of FIGS. 3A and 3B), and controlling the NVM controller to store the data includes using the firmware storage device to determine whether the address corresponds to the default boot LUN. Responsive to a determination that the address corresponds to the default boot LUN, the memory location is obtained from the firmware storage device and the NVM controller is controlled to store the data at the memory location.

In an implementation, the processor of the HBA determines whether the address corresponds to the default boot LUN by determining whether the address is stored in the firmware storage device in association with a memory location corresponding to the default LUN. In a case where the address is stored in the firmware storage device in association with a memory location corresponding to the default LUN, the processor of the HBA determines that the address corresponds to the default boot LUN, and the processor obtains the memory location stored in the firmware storage device in association with the address.

In an embodiment, the processes of FIG. 5B are performed by a processor of the HBA (e.g., the management processor 303 of FIGS. 3A and 3B) that executes machine-executable instructions of an HBA firmware (e.g., the firmware 313 of FIGS. 3A and 3B) that are stored on a storage device (e.g., the internal storage device 313I and the external storage device 313E of FIGS. 3A and 3B).

In an implementation, the processor of the HBA (e.g., the management processor 303 of FIGS. 3A and 3B) executes machine-executable instructions of a PCI express interface. In an implementation, the instructions of the PCI express interface are included in the HBA firmware (e.g., the firmware 313 of FIGS. 3A and 3B). In an implementation, the instructions of the PCI express interface are stored on a storage device of the HBA processor (e.g., the internal storage device 313I and the external storage device 313E of FIGS. 3A and 3B). The processor executes the instructions of the PCI express interface to process information specified in PCI express write requests received at the bus controller of the HBA (e.g., the controller 307 of FIGS. 3A and 3B). For example, the HBA processor uses the PCI express interface to obtain the address of the default LUN of the NVM and the corresponding OS image data from a PCI write request received from the server. The processor executes the instructions of the PCI express interface to generate PCI requests and send the PCI requests to the server via the bus controller of the HBA (e.g., the controller 307 of FIGS. 3A and 3B). For example, the HBA processor uses the PCI express interface to send the server with information to select the NVM as a boot LUN for booting an operating system from an OS image stored on the NVM, as described in relation to FIG. 6B.

By virtue of the foregoing, the OS storage stack can perform OS installation onto the default LUN of the NVM as if it were installing the OS onto a remote SAN LUN accessible by the HBA via a SAN. At the HBA, the HBA's management processor (e.g., 303 of FIGS. 3A and 3B) presents the NVM (e.g., 305) to the OS storage stack as a LUN, and directs any data (e.g., I/O) coming to the HBA's bus controller (e.g., the PCI express controller 307) from the OS storage stack to the NVM by using the NVM controller (e.g., 304). At the server, the OS storage stack stores the data in the default LUN by using a PCI express write request that is a same type of PCI write request used by the OS storage stack to perform a remote SAN boot installation process (e.g., a process involving sending data of an OS image for storage on a SAN LUN via a SAN). Therefore, the OS storage stack can perform OS installation onto the default LUN of the NVM as if it were installing the OS onto a SAN LUN accessible by the HBA via a SAN.

OS Software Boot Up Methods

With the operating system installed into the non-volatile storage memory 305, the server 112 can then boot up from the operating system stored therein.

Figure 6A:
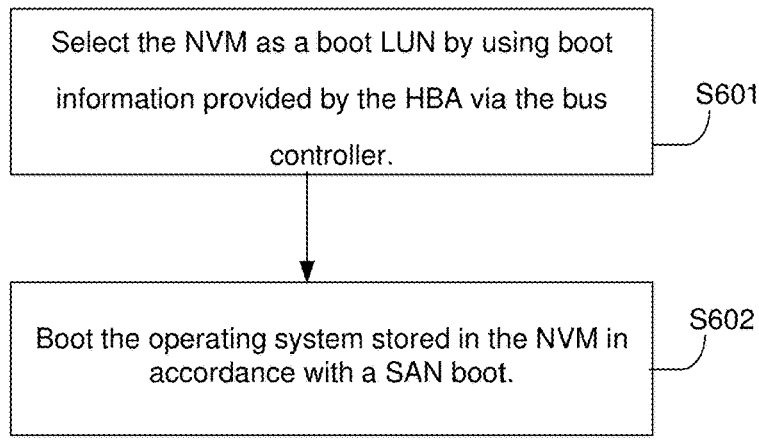
FIG. 6A illustrates a functional flow diagram of OS boot up.

Referring now to FIG. 6A, a functional flow diagram of operating system (OS) boot up is illustrated. In accordance with an embodiment of FIG. 6A, operating system boot up includes, at a disk-less server (e.g., the server 112 of FIG. 2A): selecting the NVM as a boot LUN by using boot information provided by the HBA via the bus controller (process S601), and booting the operating system stored in the NVM in accordance with a SAN boot (process S602).

In an implementation, selecting the NVM as a boot LUN by using boot information provided by the HBA via the bus controller (process S601) includes: receiving the boot information from the HBA, and determining selection of a boot LUN. In an implementation, the boot information is received from the HBA via a PCI express request. In an implementation, the boot information includes at least one PCI express address that corresponds to a bootable LUN. In an implementation, the boot information includes PCI express addresses for all bootable LUN's detected by the HBA, including remote SAN LUNs and one or more LUN stored on the NVM of the HBA. In an implementation, selection of the boot LUN includes, at the server, receiving a user selection of a boot location corresponding to an address of a LUN provided by the HBA. In an implementation, selection of the boot LUN includes, at the server, using configuration information of a BIOS of the server (stored on a storage device, e.g., a ROM, of the server) to select a boot location corresponding to an address of a LUN provided by the HBA.

In an implementation, booting the operating system stored in the NVM in accordance with a SAN boot (process S602) includes: at the server, using a processor of the server to execute machine-executable instructions of a BIOS of the server (stored on a storage device, e.g., a ROM, of the server) to perform a SAN boot process, and using the boot location selected at the process S601 as the SAN boot location for the SAN boot process.

In an embodiment, the processes of FIG. 6A are performed by a processor of a server (e.g., processor 201 of server 112 of FIG. 2A) that executes machine-executable instructions that are loaded into a memory (e.g., the memory 205 of FIG. 2A) from a non-volatile storage device.

Figure 6B:
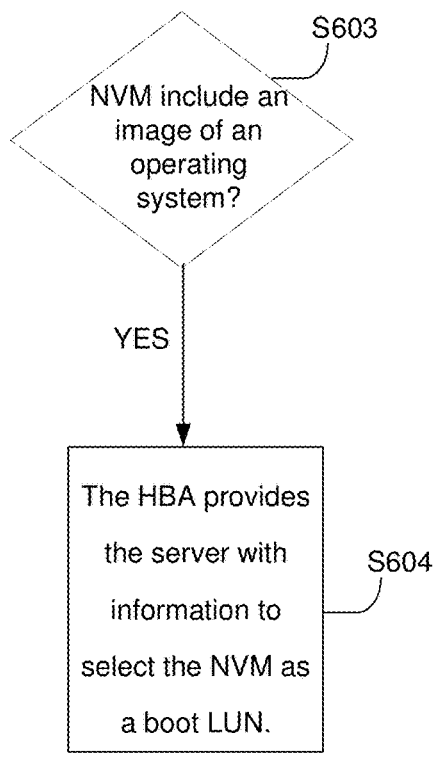
FIG. 6B illustrates a functional flow diagram of OS boot up.

Referring now to FIG. 6B, a functional flow diagram of operating system (OS) boot up is illustrated. In accordance with an embodiment of FIG. 6B, operating system boot up includes, at the HBA (e.g., one of the host bus adapters 122 and 122' of FIGS. 3A and 3B), and during power up of the HBA: determining whether the NVM includes an image of an operating system (process S603); and, in a case where it is determined that the NVM includes an image of an operating system, controlling the HBA to use the bus controller to provide the server with information to select the NVM as a boot LUN for booting the operating system (process S604).

In an implementation, determining whether the NVM includes an image of an operating system (process S603) includes: the HBA determining whether the NVM stores at least one image of an operating system based on at least one of a format of data stored in the NVM, based on content of data stored on the NVM, and presence of data on the NVM at the memory location associated with the default boot LUN. For example, if the memory location associated with the default boot LUN does not contain data, then the HBA determines that the NVM does not include an image of an operating system.

In an implementation, the HBA determines whether the NVM stores an image of an operating system based on information stored in the firmware storage device of the HBA (e.g., the internal storage device 313I and the external storage device 313E of FIGS. 3A and 3B). For example, if the firmware storage device stores information indicating that a memory location corresponding to the default LUN includes an image of an operating system, then the HBA determines that the NVM stores an image of an operating system.

In some implementations, the firmware storage device stores information about any operating system image stored on the NVM. In some implementations, the NVM stores a plurality of bootable OS images, and the firmware storage device stores information about each of the stored bootable OS images, such that the HBA can provide information to the server for booting any of the bootable OS images stored on the default LUN.

In an implementation, the HBA determines whether the NVM stores at least one image of an operating system responsive to a scan by a boot component of the HBA. In an implementation, the scan is a SCSI scan. In an implementation, the boot component is an X86 BIOS boot component. In an implementation, the boot component is a UEFI (Unified Extensible Firmware Interface) boot component. In an implementation, the boot component is an OpenBoot boot component. In some implementations, the boot component includes machine-executable instructions stored on a storage device (e.g., the internal storage device 313I and the external storage device 313E of FIGS. 3A and 3B) of the HBA and executed by a processor of the HBA (e.g., the management processor 303 of FIGS. 3A and 3B). In an implementation, the boot component is included in firmware of the HBA.

In an implementation, in a case where the HBA is communicatively coupled to a SAN fabric, the HBA identifies remote SAN boot LUNs accessible by the HBA (via the SAN fabric) during the scan by the boot component, and the HBA provides the server with information to select any identified bootable OS of the NVM and any identified remote SAN boot LUN as a boot LUN for booting the operating system. In an implementation, during the scan by the boot component, the HBA discovers remote LUNs by using at least one of an iSCSI, FC, and FCoE protocol.

In an implementation, in a case where it is determined that the NVM includes an image of an operating system, controlling the HBA to use the bus controller to provide the server with information to select the NVM as a boot LUN for booting the operating system (process S604) includes: providing the server with an address corresponding to the default boot LUN. In an implementation, the address is a PCI express address that is used by the OS storage stack of the server during a remote SAN boot installation process, and the OS storage stack performs the SAN boot installation onto the default LUN by providing the HBA with a PCI express write request that specifies the PCI express address of the default LUN and data of the OS image to be installed onto the default LUN of the NVM. In an implementation, in a case where a plurality of bootable OS images are stored on the NVM, the HBA provides the server with an address corresponding to each bootable OS image.

In an embodiment, the processes of FIG. 6B are performed by a processor of the HBA (e.g., the management processor 303 of FIGS. 3A and 3B) that executes machine-executable instructions of an HBA firmware (e.g., the firmware 313 of FIGS. 3A and 3B) that are stored on a storage device (e.g., the internal storage device 313I and the external storage device 313E of FIGS. 3A and 3B).

Direct Memory Access of Storage on HBA

In an implementation, a HBA in accordance with embodiments herein (e.g., one of the host bus adapters 122 and 122' of FIGS. 3A and 3B) provides direct memory access to the NVM (e.g., the flash storage 305 of FIGS. 3A and 3B) via the NVM controller. Providing direct memory access to the NVM includes, at the HBA and responsive to data received from a server via the bus controller of the HBA: in a case where the data is associated with a memory address of the bus controller, using the NVM controller to store the data in the NVM in accordance with a direct memory access (DMA). In an implementation, the HBA receives the data associated with the memory address responsive to a write request in accordance with the bus communication protocol of the bus controller.

In an implementation, a HBA in accordance with embodiments herein (e.g., one of the host bus adapters 122 and 122' of FIGS. 3A and 3B) provides direct memory access to the NVM (e.g., the flash storage 305 of FIGS. 3A and 3B) via the NVM controller. The bus controller is a PCI express controller constructed to communicate information between the HBA and the server by using a PCI express protocol. The HBA receives data from the server responsive to a PCI express write request in accordance with the PCI express protocol, the PCI express write request specifying an address corresponding to the data sent from the server. Providing direct memory access to the NVM includes, at the HBA and responsive to data received from a server via the PCI express controller of the HBA: in a case where the data is associated with an address recognized by the NVM controller of the HBA, using the NVM controller to store the data in the NVM in accordance with a direct memory access (DMA). In an implementation, the HBA receives the data to be written to the NVM responsive to a PCI express write request that specifies the data to be written via DMA and the address recognized by the NVM controller.

In an implementation, the NVM executes machine-executable instructions of a PCI express interface. In an implementation, the instructions of the PCI express interface are included in firmware of the NVM controller. In an implementation, the instructions of the PCI express interface are stored on a storage device of the NVM controller. The NVM controller executes the instructions of the PCI express interface to process information specified in PCI express requests received at the bus controller of the HBA (e.g., the controller 307 of FIGS. 3A and 3B). In an implementation, the NVM controller executes the instructions of the PCI express interface to generate PCI requests and send the PCI requests to the server via the bus controller of the HBA (e.g., the controller 307 of FIGS. 3A and 3B).

In an implementation, the NVM controller includes circuitry constructed to process information specified in PCI express requests received at the bus controller of the HBA. In an implementation, the NVM controller includes circuitry constructed to generate PCI requests and send the PCI requests to the server via the bus controller of the HBA.

In an implementation, the NVM controller stores PCI express addresses corresponding to memory locations of the NVM that are accessible via DMA. In a case where a PCI express request received at the bus controller of the HBA specifies an address stored by the NVM controller, the NVM controller processes the PCI request, for example, by storing associated data in the NVM in accordance with a direct memory access (DMA). In a case where a PCI express request received at the bus controller of the HBA does not specify an address stored by the NVM controller, the NVM controller ignores the PCI express request. In an implementation, the NVM controller does not store the PCI express address of the default LUN, whereas the processor of the HBA does store the PCI express address of the default LUN (e.g., in at least one of the firmware 313, the internal storage device 313I and the external storage device 313E of FIGS.

3A and 3B). In a case where the PCI express address of the default LUN is not stored by the NVM, the NVM controller ignores a PCI express request used by the server to store data of an OS image onto the default LUN of the NVM, and the processor of the HBA processes the PCI express request to store the data of the OS image onto the NVM by controlling the NVM controller.

Direct memory access of the NVM can be used to store one or more of maintenance and debugging software onto the NVM and to manage the OS image stored on the NVM.

Advantages

There are a number of advantages of having a built-in storage on the host bus adapter. No additional HBA is required to provide OS boot. With the operating system stored on the built in storage, there are no operating system boot failures due to SAN fabric issues and lost communication over the network. The OS boot performance will be significantly improved with local storage and read-writeable non-volatile memory (e.g., Flash EEPROM memory devices) that provides faster data access than hard disk drives. There is no SAN configuration required for the installation and usage of the local storage, a default logical unit number (LUN) is assigned to the built-in storage. Disk-less servers can be purchased without a DAS controller saving costs.

CONCLUSION

When implemented in software, the elements of the embodiments are essentially the code segments or instructions to perform the functional tasks described herein. The code segments or instructions are executable by a processor, such as processor 201 of FIG. 2 and can be stored in a storage device or a processor readable storage medium, such as memory 305 in FIG. 3, awaiting execution. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, a hard disk. The code segments or instructions may be downloaded via computer networks such as the Internet, Intranet, etc. into the processor readable storage medium.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

Various combinations and sub-combinations, and modifications as may be made, of the presently disclosed components and embodiments and aspects are contemplated whether or not specifically disclosed hereunder, to the extent and as are apparent to one of ordinary skill based upon review of this disclosure and in order to suit a particular intended purpose or application.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the embodiments are limited only by the claims that follow below.

What is claimed is:

1. A method of a storage area network comprising:
responsive to data received from a server at a host bus adapter via a bus controller of the adapter, wherein the data is received in a request that specifies an address:
in a case where the address specified in the request comprises a predetermined address corresponding to a default boot logical unit (LUN) of a non-volatile memory (NVM) of the adapter, storing the data in the NVM; and
in a case where the address specified in the request does not comprise the predetermined address corresponding to a boot LUN of the NVM, communicating the data over the storage area network.

2. The method of claim 1, wherein
the predetermined address is an I/O address of the bus controller and wherein the predetermined address is provided to an operating system storage stack as an address corresponding to a Storage Area Network (SAN) boot LUN.

3. The method of claim 1, wherein
the predetermined address corresponds to a memory location of the NVM that is associated with the default boot LUN.

4. The method of claim 3, further comprising:
during power up of the adapter, in a case where it is determined that the NVM includes an image of an operating system, controlling the adapter to use the bus controller to provide the server with information to select the NVM as a boot LUN for booting the operating system.

5. The method of claim 4, wherein
the adapter determines whether the NVM stores an image of an operating system based on at least one of a format of data stored in the NVM, based on content of data stored on the NVM, and presence of data on the NVM at the memory location associated with the default boot LUN.

6. The method of claim 4, further comprising:
during installation of an operating system at the server, providing an operating system storage stack with information for installing an image of the operating system onto the NVM at the memory location associated with the default boot LUN.

7. The method of claim 3, wherein
storing the data in the NVM comprises: controlling an adapter processor of the adapter to store the data by controlling an NVM controller of the adapter to store the data in the NVM in accordance with a direct memory access (DMA) at the memory location that is associated with the default boot LUN.

8. The method of claim 7, further comprising
storing the predetermined address of the default boot LUN in association with the memory location of the default boot LUN in a firmware storage device of the adapter.

9. A server system comprising:
an adapter device of a disk-less server in a storage area network (SAN), the adapter device constructed to:
  responsive to data received from a server at a host bus adapter via a bus controller of the adapter:
    in a case where the data is associated with a predetermined address corresponding to a default boot logical unit (LUN) of a non-volatile memory (NVM) of the adapter, store the data in the NVM, and
    in a case where the data is not associated with the predetermined address corresponding to a boot LUN of the NVM, communicate the data over the storage area network,
  during power up of the adapter, in a case where it is determined that the NVM includes an image of an operating system, control the adapter to use the bus controller to provide the server with boot information to select the NVM as a boot LUN for booting the operating system, and
the disk-less server constructed to:
  during installation of an operating system at the server:
    provide an operating system storage stack with the predetermined address corresponding to the default boot LUN as an address corresponding to a SAN boot LUN, and
    send data of an image of the operating system to the adapter device via a PCI express write request that specifies the address corresponding the default boot LUN, and
  during booting at the server:
    selecting the NVM as a boot LUN by using the boot information provided by the adapter via the bus controller; and
    booting the operating system stored in the NVM in accordance with a SAN boot.

10. The server system of claim 9, wherein
the predetermined address is an I/O address of the bus controller.

11. The server system of claim 9, wherein
the predetermined address corresponds to a memory location of the NVM that is associated with the default boot LUN.

12. The server system of claim 11, wherein
the adapter is configured to use the bus controller to provide the server with information to select the NVM as the boot LUN for booting the operating system.

13. The server system of claim 12, wherein
the adapter determines whether the NVM stores the image of the operating system based on at least one of a format of data stored in the NVM, based on content of data stored in the NVM, and presence of data on the NVM at the memory location associated with the default boot LUN.

14. The server system of claim 11, wherein
during installation of the operating system, an operating system storage stack is provided with information for installing the image of the operating system onto the NVM at the memory location associated with the default boot LUN.

15. The server system of claim 14, wherein
the predetermined address of the default boot LUN is stored in association with the memory location of the default boot LUN in a firmware storage device of the adapter.

* * * * *